United States Patent [19]

Kunitsugu

[11] Patent Number: 4,867,560
[45] Date of Patent: Sep. 19, 1989

[54] OPTICAL ALIGNMENT SYSTEM

[75] Inventor: Michimasa Kunitsugu, Tokyo, Japan

[73] Assignee: NEC Corporation, Tokyo, Japan

[21] Appl. No.: 181,028

[22] Filed: Apr. 13, 1988

[30] Foreign Application Priority Data

Apr. 13, 1987 [JP] Japan .................................. 62-90189
Jul. 11, 1987 [JP] Japan ................................ 62-172090

[51] Int. Cl.$^4$ ......................... G01B 11/26; B23K 9/00; H04B 9/00
[52] U.S. Cl. ............................... 356/152; 219/121.76; 455/606; 455/607; 455/617
[58] Field of Search ..................... 219/121.76; 455/606, 455/607, 617

[56] References Cited

U.S. PATENT DOCUMENTS

| | | |
|---|---|---|
| 3,727,223 | 4/1973 | O'Meara . |
| 3,799,676 | 3/1974 | Chatterton .......................... 356/152 |
| 3,902,036 | 8/1975 | Zaleckas .......................... 219/121.76 |
| 4,102,572 | 7/1978 | O'Meara .............................. 356/152 |
| 4,215,936 | 8/1980 | Winocur .............................. 356/152 |
| 4,576,480 | 8/1986 | Travis .................................. 356/152 |
| 4,618,759 | 10/1986 | Miller et al. ......................... 356/152 |
| 4,635,299 | 1/1987 | MacGovern ........................ 455/606 |
| 4,769,523 | 9/1988 | Tanimoto et al. ............. 219/121.76 |
| 4,811,061 | 3/1989 | Sud et al. ............................. 356/152 |

OTHER PUBLICATIONS

W. Casey, "Design of a Wideband Free-Space Lasercom Transmitter", SPIE, vol. 616, Optical Technologies for Communication Satellite Applications (1986), pp. 92-104.
K. Winick, "Atmospheric Turbulence-Induced . . . Links", Applied Optics, vol. 25, No. 11, Jun. 1, 1986, pp. 1817-1825.

Primary Examiner—Stephen C. Buczinski
Attorney, Agent, or Firm—Sughrue, Mion, Zinn, Macpeak & Seas

[57] ABSTRACT

In systems such as satellite communication systems and laser machining systems in which accurate focusing of a communications beam or a machining laser beam is critical, a dual-beam optical alignment system provides automatic compensation for variations in system operation, such as temperature variations and aging, which can cause misalignment. Separate control circuits receive outputs of a beam position sensor which in turn receives divided outputs of each of the dual beams. The divided outputs are provided by a quartered light-sensitive surface which is divided into equal portions along rectilinear coordinates. Alignment is provided in accordance with differences in magnitudes of beams output by each of the respective quarters from a reference value.

11 Claims, 4 Drawing Sheets $\Sigma = X^+ + X^- + Y^+ + Y^-$

OPTICAL ALIGNMENT SYSTEM

BACKGROUND OF THE INVENTION

The present invention relates to an optical alignment system applicable to an optical communication system or a laser machining apparatus and, more particularly, to an optical alignment system for adjusting the optical axes of a plurality of beams, each having a different wavelength, to a predetermined position.

With optical alignment of the kind described, it is a common practice to adjust the positions of a laser, lens, mirrors and others at the stage of production so that the optical axis of a laser beam which is adapted for communication or machining may be aligned with a desired axis. For example, in a laser machining apparatus which uses a laser beam for machining a workpiece and a visible probe beam for observing a point of the workpiece being machined and having a different wavelength from the machining beam, lenses, mirrors, and beam splitters have to be so positioned as to bring the optical axes of the two beams into alignment and thereby to cause a point being observed into coincidence with a point being actually machined. A problem heretofore pointed out is that the positions of the optical axes of the machining and probe beams tend to deviate due to the movement of optics caused by temperature variation and aging, and due to distortion of a laser medium caused by heat, resulting in poor machining accuracy.

Further, in the case of bidirectional optical communication between satellites or between a satellite and a ground station which uses light beams of different wavelengths as transmission signals, it is necessary that various structural elements be positioned with considerable accuracy because the transmitting and receiving stations are located at a considerable distance from each other. In this case, too, should the optical axis of a transmitted beam or received a beam be dislocated due to changes in the positions of a lens, mirrors and other optical elements installed in a satellite or in a ground station, communication would practically fail.

SUMMARY OF THE INVENTION

It is therefore an object of the present invention to provide an optical alignment system capable of automatically adjusting the axes of beams of different wavelengths into a predetermined optical axis.

It is another object of the present invention to provide an optical alignment system which eliminates the need for an operator's readjustment of optical axes.

It is another object of the present invention to provide an optical alignment system capable of automatically correcting the shift of optical axes which is ascribable to the dislocation of a lens, mirror and other optical elements due to temperature variations and aging, and to the distortion of light sources due to heat.

The optical alignment system of the present invention includes first and second light source means for emitting, respectively, a first and a second light beam which are different in wavelength from each other, and driver means for driving the first and second light source means such that frequency components of optical signals of the two light beams differ from each other. The first and second light beams are multiplexed by optical multiplexer means with respect to wavelength and are introduced to single beam position sensor means. The single beam position sensor means receives the multiplexed first and second light beams and produces electrical signals representative of differences between actual positions of the sensor means on which the multiplexed first and second light beams are incident and first and second reference positions corresponding to the first and second light beams. In response to the output of the beam position sensor means, first control means extracts the frequency component of the optical signal of the first light beam so as to produce a first control signal which is representative of a difference between the actual position of the first light beam and the first reference position. At the same time, a second control circuit extracts the frequency component of the optical signal of the second light beam so as to produce a second control signal which is representative of a difference between the actual position of the second light beam and the second reference position. Beam adjusting means adjusts the optical axes of the first and second light beams in response to the first and second control signals. This adjustment is continued until the first and second light beams become incident on to the first and second reference positions, respectively. The first and the second reference position on the sensor means maybe coincident with the center axis of the sensor means.

Another optical alignment equipment of the present invention includes, instead of the driver means, optical modulator means which receives at least one of the first and second light beams for modulating the beam or beams incident thereto such that the frequency components of optical signals of the two beams differ from each other.

BRIEF DESCRIPTION OF THE DRAWINGS

The present invention will be better understood from the following detailed description taken with the accompanying drawings in which.

DETAILED DESCRIPTION OF THE PREFERRED EMBODIMENTS

Figure 1:
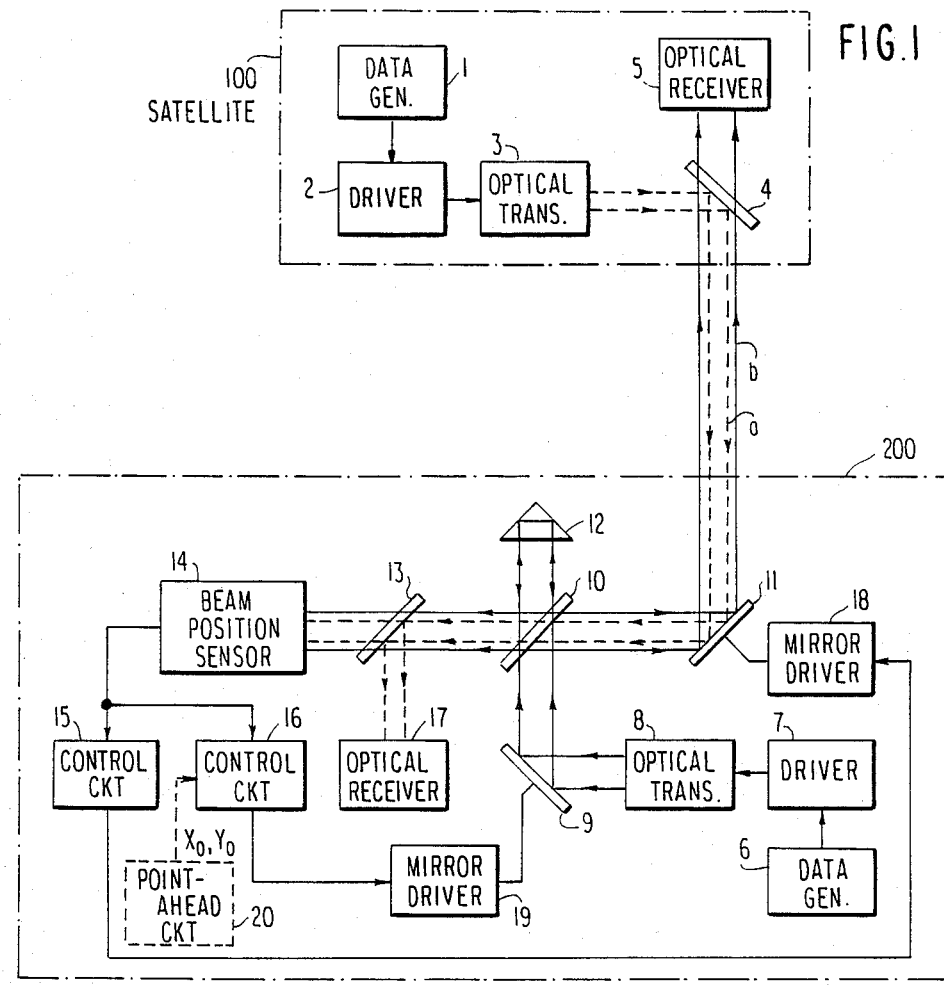
FIG. 1 is a schematic block diagram of a satellite communication system in which the present invention is implemented.

Referring to FIG. 1 of the drawings, an optical alignment system of the present invention is implemented with bidirectional communication between geostationary satellites which are placed in orbits 50 –80,000 Km distant from each other. In the figure, portions other than those adapted for optical communication are omitted for clarity.

As shown, the satellite 100 includes a data generator 1 for generating a bit sequence of logical ONEs and ZEROs, or digital communication data, at a bit rate of 50 Mb/s. A driver 2 provides a semiconductor laser with a driving current which contains a component obtained by amplitude-modulating the bit sequence with an analog signal having a frequency $f_1$ (for example, 1 KHz) lower than the bit rate of the bit sequence. The semiconductor laser which is included in an optical transmitter 3 converts the driving current into a sequence of optical signals which includes a frequency component $f_1$. The lasing wavelength of the laser is, say, 0.83 μm. The optical transmitter 3 also includes transmission optics for converting the laser beam into a parallel beam. The reference numerals 4 and 5 designate respectively a dichroic mirror and an optical receiver. The dichroic mirror 4 reflects and converts the parallel beam into a beam a (dashed line) toward the satellite 200. The dichroic mirror 4 transmits almost all of a beam b (solid line) having a wavelength of 0.78 μm from the satellite 200 to the receiver 5 which transforms the received beam into an electrical signal, then detects communication data, and then processes the data.

The satellite 200 includes a data generator 6 for generating communication data to be transmitted to the satellite 100 and having a bit rate of 50 Mb/s. A driver 7 performs functions similar to those of the driver 2 of the satellite 100. The driver 7 drives a semiconductor laser with a driving current containing an amplitude-modulated bit sequence which is produced by amplitude-modulating a bit sequence of 50 Mb/s with an analog signal of frequency $f_2$, say, 10 KHz, which is higher than the frequency $f_1$. The semiconductor laser included in an optical transmitter 8 generates a sequence of optical signals which contain a component having the frequency $f_2$. The laser lases at a wavelength of 0.78 μm. Also included in the satellite 200 are XY driven mirrors 9 and 11, a dichroic mirror 10 functioning to multiplex two beams together with a corner cube 12 and a dichroic mirror 13, and an optical receiver 17 for detecting communication data out of a laser beam which is emitted from the satellite 100. Further included in the satellite 200 are a beam position sensor 14 and control circuits 15 and 16 which serve to automatically control the axes of the beam a (dashed line) from the satellite 100 and that of the transmit beam b (solid line) to the center of the sensor.

Although FIG. 1 contains a block 20 named a point ahead circuit, the circuit is not needed for geostationary satellites and will be explained later in the case in which one satellite is moving relative to the other.

In the satellite 200, the beam b from the transmitter 8 is routed through the mirror 9, dichroic mirror 10, mirror 11 and dichroic mirror 4 to the receiver 5. At the same time, a part of the beam b passed through the dichronic mirror 10 is reflected by a reflector (corner cube mirror) 12 and the dichroic mirror 10 and then passed through the dichroic mirror 13 to reach the beam position sensor 14. On the other hand, the output beam a of the transmitter 3 which consists of a sequence of optical signals including a component of frequency $f_1$ is routed through the dichroic mirror 4, mirror 11 and dichroic mirrors 10 and 13 to be incident partly to the beam position sensor 14 and partly to the receiver 17.

The dichroic mirror 10 reflects 99.5% of the beam b which is outputted by the transmitter 8 and has a wavelength of 0.78 μm while passing the remaining 0.5%. The dichroic mirror 10 passes almost all the beam a having the wavelength of 0.83 μm which is reflected by the mirror 11 while reflecting all the beam from the reflector 12. Further, the dichroic mirror 13 transmits almost all the beam b from the transmitter 8, transmits 20% of the beam a, and reflects 80% of the beam a toward the receiver 17. For details of such dichroic mirrors, a reference may be made to William L Gasey "Design of a wideband free-space lasercom transmitter", SPIE Vol. 616, Optical Technologies for Communication Satellite Applications, 1986.

Figure 2:
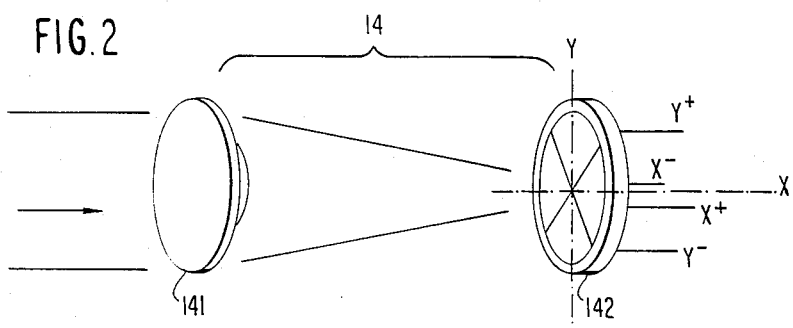
FIG. 2 is a perspective view of a beam position sensor shown in FIG. 1.

Referring to FIG. 2, a specific construction of the beam position sensor 14 is shown. As shown, the beam position sensor 14 is constituted by a convex lens 141 for transforming an incidence angle of a beam into a positional displacement of a focus point, a quartered beam-sensitive device 142 which is implemented with four silicon photodiodes for converting beam positions into electrical signals associated with the X and Y coordinates. Specifically, the beam-sensitive device 142 has four beam-sensitive areas which are defined such that the borders of nearby areas are each inclined 45 degrees relative to the X and Y coordinates. When a light beam is incident on the center of the X and Y coordinates, the output signals $X^+$, $X^-$, $Y^+$ and $Y^-$ of the beam-sensitive device 142 are equal to each other. Assume that, due to a deviation of the light beam a which is emitted from the satellite 100 toward the satellite 200, the optical axis of the beam a is dislocated from the center of the X and Y coordinates of the light-sensitive device 142. Then, the output signals $X^+$, $X^-$, $Y^+$, $Y^-$ associated with the beam a which includes the component having the frequency of $f_1$, change in their intensity according to the displacement from the center of the X, Y coordinates. The control circuit 15 extracts through filters components of frequency $f_1$ from the output signals $X^+$, $X^-$, $Y^+$, $Y^-$ and controls the mirror 11 through a mirror driver so that the axis of the beam a is coincident with the center of the X, Y coordinates. Similarly, the control circuit 16, mirror driver 19 and mirror 9 cooperate to control the axis of the beam b which is outputted by the transmitter 8. In the case that the beams a and b are simultaneously incident on the beam position sensor 14 and are different in intensity by more than 20 dB, it is difficult to detect a signal frequency component associated with one beam which is less intense than the other out of the outputs of the sensor 14. In such a case, the beam having a greater intensity than the other has to be attenuated by an optical attenuator.

By the control described above, the optical axes of the beams a and b from the transmitters 3 and 8 are individually aligned with the center of the X and Y coordinates of the the beam position sensor 14 so that the two beams a and b are efficiently incident on light-sensitive areas of light-receiving elements of the receivers 5 and 17.

Figure 3:
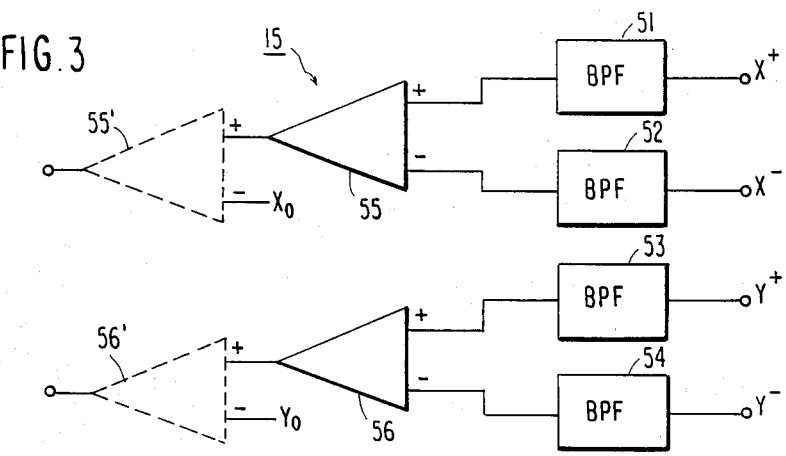
FIG. 3 is a schematic block diagram of a specific construction of a control circuit shown in FIG. 1.

Referring to FIG. 3, a specific construction of the control circuit 15 of FIG. 1 is shown and includes bandpass filters (BPFs) 51 to 54. The four output signals $X^+$, $X^-$, $Y^+$ and $Y^-$ of the beam position sensor 14 are respectively applied to the band pass filters (BPFs) 51 to 54 which are adapted to extract the frequency $f_1$ component (1 KHz) of the signal sequence of the beam a. A subtractor 55 produces an X-axis control signal which is representative of a difference between the $X^+$ and $X^-$ signals while a subtractor 56 produces a Y-axis control signal which is representative of a difference between the $Y^+$ and $Y^-$ signals. The X-axis and Y-axis control signals are fed to the mirror driver 18. In response, the driver 18 adjusts the angular position of the mirror 11 in the X and Y directions so that the X, Y-axes control signals are zero. It is to be noted that such rotating directions of the mirror are individually coincident with the X- and Y-axis of the beam position sensor 14.

Subtractors 55' and 56' will be described later with the embodiment relating to the point ahead circuit.

Figure 4:
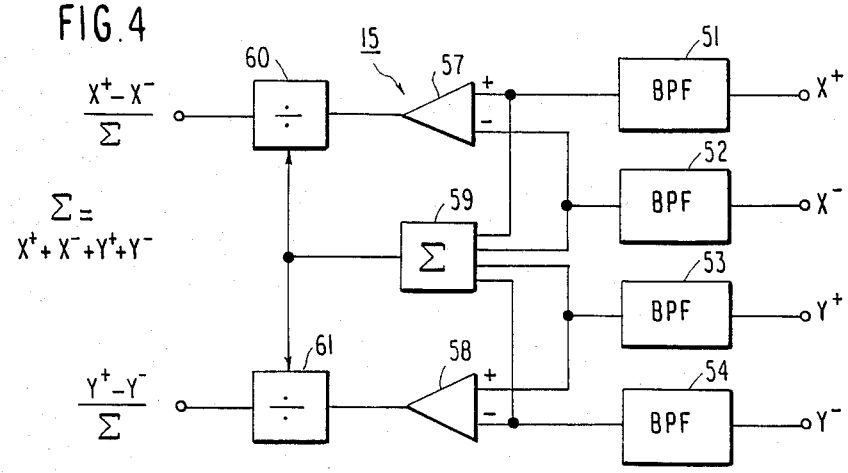
FIG. 4 is a schematic block diagram showing another specific construction of the control circuit.

FIG. 4 shows another specific construction of the control circuit 15 in which the subtractors 55 and 56 of FIG. 3 are replaced with subtractors 57 and 58, an adder 59, and dividers 60 and 61. The subtractor 57 subtracts an output of the BPF 52 from that of the BPF 51 while the subtractor 58 subtracts an output of the BPF 54 from that of the BPF 53. The adder 59 sums outputs of the BPFs 51 to 54. The divider 60 divides an output of the subtractor 57 by that of the adder 59 while the divider 61 divides an output of the subtractor 58 by that of the adder 59. Hence, an X-axis and a Y-axis control signal are respectively outputted by the dividers 60 and 61 which normalize the difference signals $(X^+ - X^-)$ and $(Y^{30} - Y^-)$ associated with the frequency $f_1$ component by the sum of the $f_1$ component signals $X^+$, $X^-$, $Y^+$ and $Y^-$, which are respectively outputted by the BPFs 51 to 54. This suppresses fluctuation of the X- and Y-axis control signals which is ascribable to the change in the power of the sensor 14.

It is to be noted that the control circuit 16 is constructed in exactly the same manner as the control circuit 15 except that the passband of its BPFs 51 to 54 is $f_2$ ($=10$ KHz). Also, the mirror 9 is driven in the same manner as the mirror 11.

As described above, the satellite 200 controls the mirrors 9 and 11 to bring the beams a and b into alignment with the center of the X and Y axes of the beam position sensor 14. Hence, when the beam a from the geostationary satellite 100 is deviated from the center of the sensor 14 due to dislocation of the satellite 100, the mirror 11 is controlled until the deviation of the beam a becomes zero. As a result, the optical axis of the beam b from the transmitter 8 is aligned with that of the beam a which is emitted by the satellite 100, allowing bidirectional communication to be effected. Further, even if the optical axes of the beams a and b are dislocated due to the movement of dichroic mirrors 4, 10 and 13 which may be caused by temperature variations and aging, the dislocation is immediately sensed by the sensor 14 so that the mirrors 9 and 11 are controlled to effect optical alignment.

The mirrors 9 and 11 which are shown in FIG. 1 as comprising a single mirror each may be implemented with an X-axis and a Y-axis galvanometer type mirror which are driven by an X-axis and a Y-axis drive signal, respectively. Further, the frequencies of $f_1$ and $f_2$ respectively assigned to the signal sequences of the beams a and b and the specific wavelengths of the laser diodes are only illustrative and are not intended to be restrictive.

Figure 5:
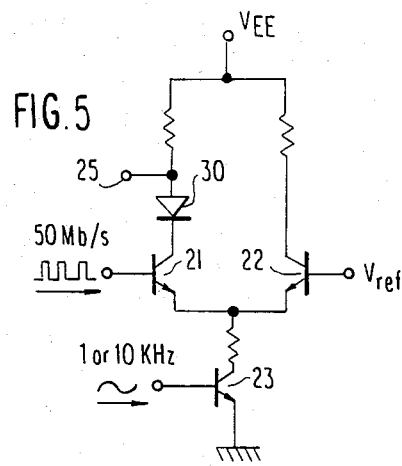
FIG. 5 is a schematic diagram of a driver illustrated in FIG. 1 together with a laser diode.
Figure 6:
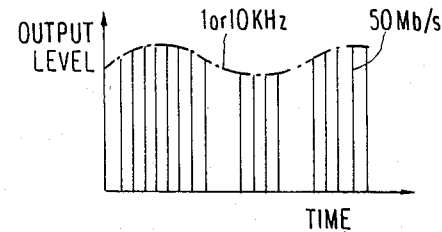
FIG. 6 is a plot showing an output waveform of a semiconductor laser which is driven by the driver of FIG. 5.

Referring to FIG. 5, there is shown a specific construction of the drivers 2 and 7 together with a laser diode. In the figure, transistors 21 and 22 are interconnected at their emitters. A laser diode 30 is connected to the collector of the transistor 21, 50 Mb/s communication data are fed to the base of the transistor 21, and a reference voltage $V_{ref}$ is applied to the base of the transistor 22. A 1 or 10 KHz analog signal (sinusoidal wave) is fed to the base of a transistor 23 depending upon the optical transmitters 3 or 8. The bias current of the laser diode is set at a threshold and is supplied to the laser diode together with the pulse current of the 50 Mb/s communication data. The analog signal gives a change of amplitude of about 5 to 10% to the communication data. The optical output waveform of the laser diode 30 is shown in FIG. 6.

While the satellite 200 of FIG. 1 has only a single optical transmitter, it may have two or more optical transmitters on condition that beams issuing from the individual transmitters are different from each other with respect to wavelength and are modulated by different respective frequencies. Further, in such a multiple transmitter scheme, extra control circuits are needed at the output side of the beam position sensor 14 to extract frequency components which are included in the signal sequences of the respective beams, so that the X and Y driven mirrors may be controlled by an X and a Y drive signal to align the optical axes of beams from the transmitters with the center of the sensor 14.

Although both the satellites 100 and 200 have been assumed to be stationary, one of them may be moving with respect to the other or even be replaced with an earth station.

In the case where the satellite 100 moves with respect to the geosynchronous satellite 200, the point-ahead circuit 20 in FIG. 1 and subtractors 55' and 56' in FIG. 3 are used. Such a relative movement requires the light beam b to be pointed ahead to reach the optical receiver of the moving satellite 100. (A point-ahead effect is described in Kim A. Winick "Atmospheric turbulence-induced signal fades on optical heterodyne communication links", APPLIED OPTICS, Vol. 25, No. 11, June 1, 1986, pp. 1817–1825, particularly page 1823 and FIG. 6.) The point-ahead circuit 20 outputs the point-ahead signals $X_0$, $Y_0$ to the subtractors 55' and 56', respectively. The subtractor 55' subtracts the signal $X_0$ from the output of the subtractor 55. The subtractor 56' subtracts the signal $Y_0$ from the output of the subtractor 56. Then, the X Y driven mirror 9 is controlled by the mirror driver 19 so that the X and Y axes control signals from the subtractors 55', 56' are zero. The signals $X_0$, $Y_0$ are determined according to the moving speed and direction of the satellite 100. Therefore, the beam b from the satellite 200 is moved by the mirror 9 so that the beam b can be received by the receiver 5 in the satellite 100. When the outputs of the subtractors 55', 56' are zero, the beam b is no longer received on the center of the X, Y coordinates of the sensor 14, but is directed to be received at a first reference position on the sensor 14. In this case, the driven mirror 11 is controlled so that the beam a from the movable satellite 100 is received on the center of the X, Y coordinates, which is a second reference position.

Although, in the above-mentioned bidirectional communication system, the satellite 100 does not incorporate such an optical alignment system as built in the satellite 200, the satellite 100 may be equipped with a similar optical alignment system.

Figure 7:
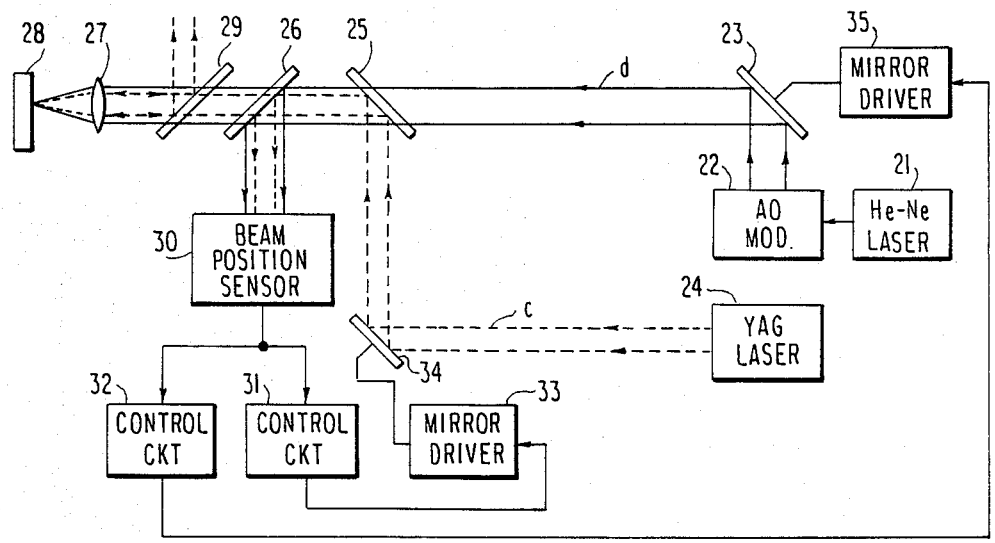
FIG. 7 is a schematic block diagram of a laser machining apparatus in which the present invention is implemented.

Referring to FIG. 7, a laser machining apparatus to which another embodiment of the present invention is applied is shown. As shown, the optical alignment system installed in the laser machining apparatus includes a helium-neon (Ne-Ne) laser 21 for emitting a visible laser beam which is adapted to observe a point of a workpiece 28 being machine, i.e., probe beam d, an yttrium aluminum garnet (YAG) laser 24 for emitting a laser beam which is adapted to machine the workpiece 28, i.e., machining beam c, and a beam position sensor 30 for sensing the optical axes of the probe beam d and machining beam c. The He-Ne laser 21 lases a CW beam whose wavelength and output are 0.63 μm and 10 mW, respectively. On the other hand, the YAG laser 24 lases a CW beam whose wavelength and output are 1.06 μm and 20 W, respectively.

The beam c from the YAG laser 24 is reflected by an X-Y driven mirror 34 and an dichroic mirror 25, then passed through a dichroic mirrors 26 and 29, and then converged by a lens 27 onto the workpiece 28. The beam from the He-Ne laser 21 is modulated by an acousto-optic (A-0) modulator 22 to generate the probe beam d. This probe beam d is reflected by an X-Y driven mirror 23, then passed through the dichroic mirror 25 and dichroic mirrors 26 and 29, and then converged by the lens 27 onto the same point of the workpiece 28 as the machining beam c. The probe beam d reflected by the workpiece 28 is reflected by the dichroic mirror 29 via the lens 27 to allow the surface of the workpiece 28 being machined to be observed by a device, not shown.

The dichroic mirror 26 reflects a part of the machining beam c and probe beam d. The beams reflected by the mirror 26 are incident to the beam position sensor 30 and thereby converted into an electrical signal. Again, the beam position sensor 30 is implemented with a converging lens and a quartered light-sensitive device, as shown in FIG. 2. Control circuits 31 and 32 also control, respectively, mirror drivers 33 and 35 and thereby the mirrors 34 and 23 in response to output signals of the sensor 30, so that the optical axes of the laser beams c and d may individually be aligned with the center of the X and Y axes of the light-sensitive device of the sensor 30.

Figure 8:
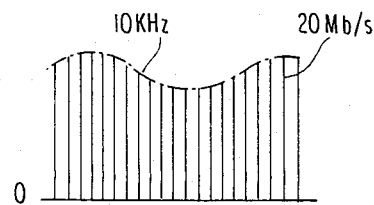
FIG. 8 is a plot showing an output waveform of a semiconductor laser which is driven by the driver of FIG. 7.

The A-O modulator 22 includes a circuit for superposing a 10 KHz sinusoidal wave on a rectangular wave having repetition frequency of 20 MHz so as to produce a signal which is shown in FIG. 8. The output of this circuit is fed to a transducer of an acousto-optic device which then produces the probe beam d associated with the signal waveform of FIG. 8. Since the construction of the A-O modulator 22 is well known in the art, details thereof will not be described to avoid redundancy.

The control circuit 32 of FIG. 7 has the same construction as the control circuit shown in FIG. 4 except that the passband of its BPFs 51 to 54 is 10 KHz, i.e. the frequency component of the signal of the probe beam d. The control circuit 31 is constituted by replacing the BPFs 51 to 54 with a DC smoother which is responsive to the component associated with the continuous laser beam c. In this instance, although the output of the DC smoother would include a detected signal component of the probe beam d, such a component would be far smaller than the detected signal component of the machining beam c. and therefore negligible. It follows that the X-axis and Y-axis control signals appearing on the outputs of the control circuits 31 and 32, respectively, are variable on the basis of the deviations of the machining beam c and probe beam d in the X and Y directions relative to the sensor 30. The mirrors 34 and 23 are respectively driven by the mirror drivers 33 and 35 until the deviations of the beams c and d become zero.

In summary, it will be seen that the present invention provides optical alignment system capable of controlling the optical axes of a plurality of beams each having a different wavelength into alignment with a predetermined optical axis or axes. Since such alignment is performed constantly and automatically, costs necessary for the maintenance and inspection, i.e., readjustment of optical axes and others are reduced.

What is claimed is:

1. Optical alignment system comprising:
   first and second light source means for emitting, respectively first and second light beams having different respective wavelengths;
   first and second driver means for driving said first and second light source means, respectively, such that optical signals corresponding to said first light beam and said second light beam contain different respective frequency components;
   optical beam multiplexer means for multiplexing said first light beam and said second light beam;
   beam position sensor means for receiving said first and second light beams form said multiplexer means to produce electrical signals which are representative of actual positions on said beam position sensor means on which said first and second light beams from said multiplexer means are incident;
   first and second control means for extracting the respective frequency components of said first and second light beams from the electrical signals which are outputted by said beam position sensor means to produce first and second control signals corresponding to differences between actual position of said first and second light beams and first and second reference positions, respectively; and
   beam adjusting means for adjusting optical axes of said first and second optical beams in response to said first control signal and said second control signal, respectively;
   the adjustment of optical axes by said beam adjusting means being continued until positions of said first and second light beams correspond to said first and second reference positions, respectively.

2. Optical alignment system as claimed in claim 1, wherein said first light source means and said second light source means each comprises a semiconductor laser.

3. Optical alignment system as claimed in claim 1, wherein said beam position sensor means comprises a light-sensitive device having a light-sensitive area divided into equal quarters by rectilinear coordinates, wherein magnitudes of said electrical signals outputted by said beam position sensor means correspond to positions of said first and second light beams with respect to said rectilinear coordinates.

4. Optical alignment system comprising:
   first and second light source means for emitting, respectively, first and second light beams having different respective wavelengths;
   modulator means for modulating optical signals corresponding to said first light beam with analog signals having a first frequency component;
   optical beam multiplexer means for multiplexing the first light beam and the second light beam from said optical modulator means;
   beam position sensor means for receiving said first and second light beams from the multiplexer means to produce electrical signals which are representative of actual positions on said beam position sensor means on which said first and second light beams from said multiplexer means are incident;
   first and second control means for extracting the respective frequency components of the first and second light beams from the electrical signals which are outputted by said beam position sensor means to produce first and second control signals corresponding to the differences between actual positions of said first and said second light beams and first and second reference positions, respectively; and beam adjusting means for adjusting optical axes of the first and the second optical beams in response to said first control signal and said second control signal, respectively;

the adjustment of optical axes by said beam adjusting means being continued until positions of said first and second light beams correspond to said first and second reference positions, respectively.

5. Optical alignment system as claimed in claim 4, wherein said beam position sensor means comprises a light-sensitive device having a light-sensitive area divided into equal sectors by rectilinear coordinates, wherein magnitudes of said electrical signals outputted by said beam position sensor means correspond to positions of said first and second light beams with respect to said rectilinear coordinates.

6. Optical alignment system comprising:
first and second light source means for emitting first and second light beams having different respective wavelengths said first and second light beams containing respective analog signal components having different respective frequencies;
optical beam multiplexer means for multiplexing said first light beam and said second light beam;
beam position sensor means for receiving said first and second light beams from the multiplexer means to produce electrical signals which are representative of actual positions on said beam position sensor means on which the first and second light beams form said multiplexer means are incident;
first and second control means for extracting said respective analog signal components of the first light beam and second light beam from the electrical signals which are outputted by said beam position sensor means to produce first and second control signals corresponding to the differences of the actual positions of said first and said second light beams and first and second reference positions, respectively; and
beam adjusting means for adjusting optical axes of the first optical beam and the second optical beam in response to, respectively, said first control signal and said second control signal;
the adjustment of optical axis by said beam adjusting means being continued until positions of said first second light beams correspond to said first and second reference positions, respectively.

7. In a satellite communications system comprising at least first and second stations, an optical alignment system comprising:
first and second light source means for emitting, respectively, first and second light beams having different respective wavelengths;
first and second driver means for driving said first and second light source means, respectively, such that optical signals corresponding to said first light beam and said second light beam contain different respective frequency components;
optical beam multiplexer means for multiplexing said first light beam and said second light beam;
beam position sensor means for receiving said first and second light beams from said multiplexer means to produce electrical signals which are representative of actual positions on said beam position sensor means on which said first and second light beams from said multiplexer means are incident;

first and second control means for extracting the respective frequency components of said first and second light beams from the electrical signals which are outputted by said beam position sensor means to produce first and second control signals corresponding to differences between actual positions of said first and second light beams and first and second reference positions, respectively; and beam adjusting means for adjusting optical axes of said first second optical beams in response to said first control signal and said second control signal, respectively;

the adjustment of optical axes by said beam adjusting means being continued until positions of said first and second light beams correspond to said first and second reference positions, respectively;

wherein alignment of said first station with said second station is maintained in accordance with an output of said optical alignment system.

8. An optical alignment system as claimed in claim 7, wherein said first station is geosynchronously aligned with said second station.

9. Optical alignment system as claimed in claim 7, wherein said first station is a satellite and said second station is a ground station, said satellite being movable with respect to said ground station.

10. Optical alignment system as claimed in claim 7, wherein said second station includes a point-ahead circuit for providing first and second reference signals in accordance with movement of said first station with respect to said second station, said second control means receiving said first and second reference signals and producing said first and second control signals accordingly.

11. In a laser machining apparatus employing a laser for machining a workpiece, an optical alignment comprising:
first and second light source means for emitting, respectively, first and second light beams having different respective wavelengths;
optical modulator means for modulating optical signals corresponding to said first light beam with analog signals having a first frequency component;
optical beam multiplexer means for multiplexing the first light beam and the second light beam form said optical modulator means;
beam position sensor means receiving said first and second light beams from the multiplexer to produce electrical signals which are representative of actual positions on said beam position sensor means on which said first and second light beams from said multiplexer means are incident;
first and second control means for extracting the respective frequency components of the first and second light beams from the electrical signals which are outputted by said beam position sensor means to produce first and second control signals corresponding to the differences between actual positions of said first second light and first and second reference positions, respectively; and
beam adjusting means for adjusting optical axes of the first second optical beams in response to said first control signal and said second control signal, respectively;

the adjustment of optical axes by said beam adjusting means being continued until positions of said first and second light beams correspond to said first and second reference positions, respectively;

wherein said first light source means comprises a helium-neon laser, said optical modulator means comprises an acousto-optical modulator, and machining of said workpiece is performed in accordance with an output of said optical alignment system.

* * * * *

UNITED STATES PATENT AND TRADEMARK OFFICE
CERTIFICATE OF CORRECTION

PATENT NO. : 4,867,560

DATED : September 19, 1989

INVENTOR(S) : Michimasa Kunitsugu

It is certified that error appears in the above-identified patent and that said Letters Patent is hereby corrected as shown below:

Column 3, line 63, delete "on be incident partly to" and insert --to be incident partly on--

Column 8, line 14, delete "form" and insert --from-- line 52, before "modulator" insert --optical--

Signed and Sealed this

Thirtieth Day of October, 1990

Attest:

HARRY F. MANBECK, JR.

Attesting Officer

Commissioner of Patents and Trademarks